United States Patent [19]
Finkel

[11] Patent Number: 5,246,727
[45] Date of Patent: Sep. 21, 1993

[54] STABILIZED EDIBLE OIL COMPOSITIONS FOR PASTRY DOUGH PRODUCTS AND PROCESS OF MAKING

[75] Inventor: Gilbert Finkel, Morristown, N.J.

[73] Assignee: Food-Tek, Inc., Morris Plains, N.J.

[21] Appl. No.: 632,109

[22] Filed: Dec. 20, 1990

Related U.S. Application Data

[63] Continuation-in-part of Ser. No. 323,348, Mar. 14, 1989, Pat. No. 4,980,192, which is a continuation-in-part of Ser. No. 48,761, May 12, 1987, Pat. No. 4,812,318, which is a continuation-in-part of Ser. No. 751,056, Jul. 2, 1985, Pat. No. 4,664,927, which is a continuation-in-part of Ser. No. 633,529, Jul. 23, 1984, abandoned.

[51] Int. Cl.⁵ .................................................. A23D 9/00
[52] U.S. Cl. ...................... 426/601; 426/330.6; 426/496; 426/556; 426/606; 426/622; 426/661
[58] Field of Search ...................... 426/556, 330, 330.6, 426/606, 622, 661, 496, 601

[56] References Cited

U.S. PATENT DOCUMENTS

| | | | |
|---|---|---|---|
| 2,132,395 | 10/1938 | Coith et al. | 426/554 |
| 2,172,211 | 1/1938 | Lloyd | 426/556 |
| 2,954,297 | 9/1960 | Elsesser et al. | 426/554 |
| 3,585,046 | 6/1971 | Schaible | 426/556 |
| 3,692,535 | 9/1972 | Norsby et al. | 426/556 |

Primary Examiner—Helen F. Pratt
Attorney, Agent, or Firm—Norman E. Lehrer; Franklyn Schoenberg

[57] ABSTRACT

A viscosity-stable shortening composition in a dry particulate form containing an admixture of a shortening component including a solid low melting point edible fat or oil suitable for use in a pastry dough, a solid edible carrier component, and from 0.2% to 10% by weight of a viscosity-stabilizer polyol component. The shortening composition is particularly suitable for use in preparing pastry dough products.

19 Claims, No Drawings

STABILIZED EDIBLE OIL COMPOSITIONS FOR PASTRY DOUGH PRODUCTS AND PROCESS OF MAKING

This application is a continuation-in-part of application Ser. No. 323,348, filed Mar. 14, 1989, now U.S. Pat. No. 4,980,192, which was a continuation-in-part of application Ser. No. 48,761, filed May 12, 1987, U.S. Pat. No. 4,812,318, which was a continuation-in-part of application Ser. No. 751,056, filed Jul. 2, 1985, U.S. Pat. No. 4,664,927, which was a continuation-in-part of application Ser. No. 633,529, filed Jul. 23, 1984, now abandoned.

The present invention relates to a method of increasing the viscosity of a fat or oil and to the product produced by that method. More particularly, this invention is directed to a technique for immobilizing the normally flowable fats or oils in systems containing these materials so that they remain substantially non-flowable even at temperatures which are above their normal melting point.

Fats and oils are widely used in food, cosmetic and pharmaceutical products. Unfortunately, many naturally occurring oils and some fats have very low melting (flow) points and, therefore, impart an undesired physical characteristic to products which contain them. The separation of peanut oil in peanut butter is one typical example of the problem. Another example is the ten-dency of natural chocolate products containing cocoa butter to stick to product wrappers or to fingers, particularly during the summer months. The separation of butter from dough in the preparation of dough for pastry products, such as croissants or danish pastry, and the surface greasiness of such products is yet another example of an adverse product characteristic resulting from the low melting and flow point of a fat-containing product.

Oils and fats can be immobilized by hydrogenation but this approach is expensive and leads to physiological properties which may be undesirable in food products. Hard fats may be substituted for oils or lower melting point fats, but this substitution often changes the texture or other eating characteristics of the product. Immobilization of fats may also be achieved by the use of stabilizers. However, such additives are often expensive and may be comprised of undesirable synthetic materials. Moreover, there is a consumer trend away from food products which contain unnatural additivies. In addition, in the case of some products, such as chocolate, the addition of a stabilizer may constitute a material departure from the standard of identity for "chocolate", thereby depriving a manufacturer of the ability to call a particular product a "chocolate" product.

Canadian Patent No. 979,730 discloses one attempt in the prior art to overcome the undesirable effect of a low melting point in a fat or oil containing system by the incorporation of colloidal silicone dioxide having a defined particle size. As described in the aforesaid patent, the oil is heated and intimately mixed with the silicone dioxide particles using high shear mixing. Thereafter, a polyol bridging compound is added in order to bind the oil in a stable matrix formed by the silicone dioxide particles and the polyol. The resulting product is a shortening which has a thick-spreading consistency and exhibits little change in viscosity at elevated temperatures. The undesirability of adding silicone dioxide particles to food products is believed to be self-evident.

Attempts have been made to produce a heat-resistant chocolate by incorporating crystalline hydrophillic substances such as dextrose, maltose, mannitol or sorbitol as humectants and exposing the chocolate, after casting, to a moist atmosphere for an extended period of time. See, for example, U.S. Pat. No. 4,446,166. The products of that process have an undesirable surface appearance as a result of sugar bloom, and the flowability of the fat immediately below the surface of the chocolate is not altered by the treatment.

Various types of polyols such as glycerine, sorbitol, mannitol and propylene glycol have been employed in liquid, semisolid or solid food applications as bodying agents, humectants, anti-oxidants, preservatives, solubilizing agents and the like. For example, Japanese Patent Application 50-96979 discloses the preparation of fat and oil compositions containing high HLB emulsifiers and inter alia, polyols, as solubilizers. U.S. Pat. No. 3,694,233 discloses gravy compositions with high water and oil content, which contains between 9 and 66% by weight of glycerol or a preservative. Polyols are also disclosed as preservatives to reduce spoilage in U.S. Pat. No. 4,252,834. However, until now the prior art has not recognized that polyols have the ability to dramatically increase the viscosity of fats and oils.

It is an object of the present invention to provide a novel method for immobilizing the fat or oil in products containing such materials.

Yet another object of the invention is to provide food products in which normally flowable fats and oils are immobilized at temperatures well above their normal flow points.

A further object of the invention is to provide novel chocolate products which do not flow at summertime conditions.

It has now been discovered that the addition of a liquid polyol to a fat or oil-containing system results in a substantial increase in the viscosity of the fat or oil. This increase in viscosity, once achieved, appears to be unaffected by increases in the temperature of the fat, even though the temperature reaches levels well above the normal melting point of the particular fat or oil. In its preferred form, the invention is directed to fat-containing systems which initially have a high viscosity and marginal flowability as a result of a relatively high solids content. In such systems, the increase in viscosity caused by the present invention is such that the fats appear to be substantially immobilized, and the resulting products exhibit the appearance and characteristics of a solid, even at temperatures which are well above the melting point of the fat component of the system. Thus, chocolate will appear to be unmelted and will not stick to wrappers or fingers, even though the chocolate is at a temperature well above the flow point of the cocoa butter contained in the chocolate. Similarly, the addition of a polyol to peanut butter is sufficient to retard the typical separation of the product into its solid and oil components.

The exact mechanism by which the increase in viscosity and immobilization of the fat or oil are achieved is not known. However, it is presently believed that the increased viscosity is due to some type of chemical interaction between the fat and the polyol. This belief stems from the fact that, after the addition of the polyol, the viscosity of the fat-containing system appears to increase with increasing time and/or temperature and, up to a point, by increasing the amount of polyol added. Moreover, after cooling, the increased viscosity appears to be unaffected by increases in temperature which are substantially above both the temperature at which the polyol was initially added as well as the melting point of the fat. Further, in order to achieve the desired increase in viscosity, the polyol must either be a liquid or be in solution when mixed with the fat or oil. All of the foregoing characteristics are consistent with the possibility of a chemical reaction between the fat and the polyol.

Any fat or oil may be utilized to form the novel products of the invention. Ordinarily, the fats and oils are of animal or vegetable origin and are edible. However, synthetic materials having substantially similar chemical compositions to fats and oils may also be used. The preferred fats and oils are lower melting point fats which exhibit some tendency to flow at ambient or slightly elevated temperatures. This would include cocoa butter, other butter products, peanut oil, and vegetable oils. However, substantially any fat or oil can be converted to a significantly higher viscosity product by virtue of the present invention.

In a preferred embodiment, the invention is particularly applicable to products containing low melting point fats or oils which also contain a substantial amount of solids suspended therein, e.g., at least 20 wt. % and preferably 30 wt. % and as much as 50 wt. % or more of suspended solids. Typical materials of the foregoing type include chocolate which contains milk solids, peanut butter which contain peanut solids, and pastry doughs which contain flour or other starch materials. When a polyol is added to such a marginally flowable system containing a substantial proportion of solids, the resulting increase in viscosity produces a system in which the fat or oil is substantially non-flowable and, for practical purposes, behaves like a solid even though the temperature of the fat-containing system is raised to a level where the fat is actually a liquid, albeit a highly viscous liquid.

Polyols which may be used in the invention are straight or branched chained hydrocarbon compounds containing at least two hydroxyl groups on the carbon skeleton. Compounds which include other functional groups, e.g., double bonds or carboxyl groups, may also be employed, provided that at least two hydroxyl groups are also present. There is no upper limit to the number of carbon atoms or hydroxyl groups which may be present on the structure. Polyols are not generally soluble in fats or oils and it is a critical feature of the invention that the polyol be in a liquid form when it is mixed with the fat. Accordingly, polyols which are naturally occurring liquids, such as glycerine, are preferred as a matter of convenience, although other polyol materials which readily form solutions having a substantial concentration of the polyol are acceptable. For example, sorbitol is commercially available as a 70% solution in water. Other materials which can be utilized in the invention include propylene glycol, mannitol, corn syrup (e.g., 42 D.E.), or a hydrogenated corn syrup, such as the mixture commercially available under the trademark LYCASIN which comprises sorbitol and a variety of hydrogenated polysaccharide compounds.

Ordinarily, the amount of polyol added to the system will be between 0.2 and 5 wt. %, preferably 0.5 and 2 wt. %. At low polyol levels, an increase in the amount of polyol results in some increase in the viscosity of a fat-containing system, but this effect does not continue at higher polyol levels. Moreover, there appears to be a direct relationship between the amount of fat present in a system and the amount of polyol which will be useful in producing an increased viscosity.

No special mixing conditions are required to form the novel products of the invention. However, it is apparent that the polyol must be in liquid form and be homogeneously dispersed in the fat-containing system. To this end, the fat or oil containing system must be in a somewhat flowable form when the polyol is added. Increased flowability may be achieved by mixing the fat-containing material with the polyol at a slightly elevated temperature, e.g., 75°–120° F. It has also been observed that the time required to achieve the increased viscosity directly varies with the temperature of the mixture. Irrespective of the temperature, however, it may be desirable to hold the mixture of the polyol and fat-containing material in storage for periods of time ranging from about 5 minutes to 60 minutes or more in order to reach a desired viscosity level before further using or processing the material. The length of time the product is held will, of course, depend on the specific nature of the product and the further proceeding steps. In those instances where a greatly increased viscosity would hinder the formation of the first product, the products may be rapidly formed after addition of the polyol and, thereafter, be held at conditions which would favor a further increase in viscosity.

A particularly preferred application of the invention is the formation of chocolate products which will remain relatively hard at elevated temperatures where the fat (cocoa butter) content of chocolate normally flows. At the average temperature of human skin (91° F.), the fat content of chocolate is soft and flowable, which serves to explain why a piece of chocolate normally sticks to a person's fingers if it is held for any significant length of time. Chocolate also sticks to wrappers at summer temperatures. If the fat content of the chocolate is immobilized by the addition of a polyol, it will not flow even at temperatures well above 91° F.

In a typical process for manufacturing chocolate or chocolate coated products in accordance with the invention, any conventional chocolate formulation may be employed. Such formulations normally contain chocolate liquor, whole milk solids, sugar and, most importantly, cocoa butter. However, any other ingredients, all of which are well known in the art, may also be used. Typically, the foregoing ingredients are mixed, refined, conched and standardized as to viscosity and are thereafter tempered by heating to an elevated temperature, e.g., 120° F., cooled to a lower temperature, e.g., 79° F. and reheated to a molding or enrobing temperature of about 85° F. The chocolate is then utilized to form a molded finished product or to enrobe or coat a pre-formed center. In either event, the chocolate is eventually cooled or refrigerated after it is put into the final product form.

In accordance with the present invention, 0.4 to 5 wt. % of a liquid polyol, e.g., glycerine, is added to the flowable chocolate mixture after it is tempered and before it is molded or used as an enrobing material. The liquid polyol is mixed with the chocolate at a temperature in the range of 75° to 95° F., preferably, 84° to 91° F. and held at that temperature for a period of 1 to 60 minutes, e.g., 8 minutes. Alternatively, the chocolate may be immediately used after addition of the polyol, provided that it is held at the molding or enrobing temperature for a time sufficient to permit the fat and polyol to interact and produce an increase in viscosity before it is refrigerated for demolding. The length of the holding time is a matter of choice based upon the fat content of the particular formulation being employed, the amount of polyol, the temperature, and the fluidity or viscosity requirements needed for efficient processing of the chocolate to form the desired end products. However, because the increase in viscosity which results from the practice of the invention is heat irreversible, it is important that careful attention be paid to the holding time and temperature so as to ensure that the desired increase in viscosity is obtained without interfering with the ability to process the chocolate into finished products.

As indicated, products such as pastry dough and the like which contain substantial amounts of solids such as flour or other starch materials in addition to low melting point fats and oils is another preferred application of the invention. As is known, pie crust or pastry dough and the like products are high in fat (generally more than 25% fat). The separation of the fat or oil (butter and/or shortening) from the dough during preparation of the dough, during storage of the dough preformed as pie crusts, danish pastry, croissants, puff pastry and the like prior to baking and the like and/or during display or storage of bakery products after baking such as croissants, danish pastry and the like results in a variety of adverse product characteristics.

A typical example of food products which are high in fat are pie crusts which as articles of commerce are available in several forms: dry mix, unbaked shells, and fully baked. While fats or shortenings used in the dough formulations for such pie crusts are solid at room temperature, a significant portion of the fat is generally fluid enough to separate therefrom during storage and shipping with deleterious effects on the quality of the resulting bakery products. Because, as shown, fluid and low melting point fats or oils are surprisingly and unexpectedly viscosity stabilized and immobilized in accordance with the present invention without the need for changing the chemical composition thereof or by use of external means such as refrigeration, the deleterious effects resulting from separation of the normally fluid portions of the fats and oils from the solid components and other ingredients of the dough is eliminated or inhibited, and the most desirable combination of ingredients and means for combining them may, thus, be employed.

In a typical process for preparation of pie crust or pastry dough products in accordance with the present invention, conventional pie crust or pastry dough ingredients can be used in the compositions. Typical dough formulating ingredients include flour, starch, shortening or oil, salt, sugar, other flavorants and a variety of other ingredients, all of which are known in the art. In accordance with the invention, the edible oil or shortening component of a pie crust or pastry dough is prepared as a separate "shortening phase" composition, preferably in the form of dry particles or crumbs. Such crumbs or particles can then be readily incorporated in conventional manner with the other ingredients of the dough formulation, generally prepared in a continuous or sheeted form, to provide a pastry or pie crust dough with the type and amount of shortening ingredients for the desired dough composition characteristics. Thus, for example, pie crust dough with discrete regions of shortening containing compositions may be prepared as well as pastry dough with the shortening blended in a homogeneous fashion. The "shortening phase" composition of the invention includes a mixture of the edible oil, shortening or fat ingredients desired for use in the pie crust or pastry dough, a solid matrix or carrier component, e.g. flour or preferably the starch ingredient for such dough formulation, together with 0.2% to 10%, preferably from about 0.8% to about 5%, of a polyol stabilizing ingredient, e.g. glycerine and propylene glycol. Polyols also suitable for use in accordance with the invention may be sugar alcohols such as mannitol, sorbitol and sucrose in liquid form, and a wide variety of other polyhydric hydrocarbon compounds, preferably in liquid form, as herein described, and mixtures of the same. The proportions of the shortening and solid carrier ingredients used in the "shortening phase" composition of the invention will generally depend on the amount of each component desired in a pastry or pie crust dough composition, i.e. 5% to 85%, preferably from about 25% to about 45%, of shortening, and 15% to 95%, preferably from about 55% to about 75%, of starch or other solid carrier.

The "shortening phase" composition of the invention may be prepared by first blending the dry materials, adding the shortening to the dry materials and blending the admixture for about 30 to 60 seconds and then adding the polyol such as glycerol. The admixture is mixed until small dry crumbs or particles are produced, e.g. 60 to 90 seconds. The "shortening phase" composition so produced comprises, for example, from about 10% to about 35%, preferably about 25%, of the total weight of the pie crust dough ingredients. The mixing temperatures, times and speeds are not as critical for forming the "shortening phase" compositions as they are for forming conventional pastry and pie crust dough and they can vary over a wide range of conditions. Conventional mixing equipment may be used, temperatures ranging from 20° F. to 135° F., preferably about 55° F. to about 90° F., are acceptable, and mixing times of 5 seconds to 4500 seconds, preferably from about 15 seconds to 300 seconds, are sufficient.

The "dough" continuous phase comprising, for example, from about 65% to about 90%, preferably about 75%, of the weight of the pie crust dough ingredients including the flour, may be prepared and sheeted out using conventional dough preparation methods. The pie crust or pastry dough may then be prepared, for example, by distributing the "shortening phase" particles or crumbs over the sheet of dough generally by sprinkling and the like and then "rolling in" the "shortening phase" particles by conventional means for the time needed to form the pie crust or pastry dough desired for final processing, storage, and/or shipping.

Alternatively, pastry and pie crust dough may be prepared in accordance with the invention by adding a portion of the "shortening phase" crumbs of the invention to the dough ingredients during preparation of the "dough" phase prior to the sheeting thereof, and then distributing a further portion of the "shortening phase" crumbs over the sheeted "dough" phase prior to further processing of the pie crust or pastry dough product.

The mixing times, temperatures and speeds for processing the pastry or pie crust dough are critical as is known in conventional pastry processing technology, but may vary depending on the particular product being prepared. Particular mixing times, temperatures and speeds for particular products can be readily determined by one skilled in the art using conventional processing technology.

The invention will be further understood from the following illustrative examples:

EXAMPLE 1

In initial tests with cottonseed oil, an oil containing substantially no suspended solids, the addition of 1% sorbitol in liquid form raised the Brookfield Viscometer reading by approximately 100% for a given rate of revolution of the viscometer disk.

EXAMPLE 2

The results obtained with semisweet chocolate and 1% polyol are shown in Table 1 below (maximum scale reading is 100).

TABLE 1

| Speed | Control (Spindle 3) | With 1% Glycerine (Spindle 5) |
|---|---|---|
| 1 | 26.8 | off scale |
| 2 | 38.5 | off scale |
| 5 | 41.0 | off scale |
| 10 | 54.0 | off scale |

EXAMPLE 3

The polyols seemingly effect fat crystal growth. The viscosity of a fat/oil system consisting of 2 parts of soybean oil and 1 part of partially hydrogenated cottonseed oil at 85° F. was 384 cps., as measured on a Brookfield Viscometer. The viscosity increased to 512 cps. after addition of 1.5 wt. % glycerine. When the fat-containing glycerine was cooled to 75° F., the viscosity increased to 640 cps. When the temperature was raised to 85° F., the viscosity remained unchanged at 640 cps., thereby demonstrating that the increase in viscosity is heat irreversible.

In similar experiments utilizing a 5 ml. Ostwold pipette, 1 wt. % of LYCASIN, Polyol 6075 (manufactured by LONZA , a partially hydrogenated corn syrup, propylene glycol, and glycerine with a mixture of 1 part vegetable oil and 9 parts partially hydrogenated cottonseed oil, the following flow rates were observed:

| Control (No Polyol) | 4 min. 17 sec. |
|---|---|
| Propylene Glycol | 4 min. 30 sec. |
| Glycerine | 4 min. 40 sec. |
| LYCASIN | 4 min. 44 sec. |
| POLYOL 6075 | 5 min. 32 sec. |

EXAMPLE 4

A chocolate was prepared to the following formula:

| Ingredient | Parts by Weight |
|---|---|
| Chocolate liquor | 10.50 |
| Whole milk solids | 22.95 |
| Sugar | 45.0 |
| Cocoa butter | 21.00 |
| Vanillin | 0.05 |
| Glycerine | 1.00 |

The above material was mixed in a 5 qt. Hobart mixer for 5 minutes. The mixed material was refined by running it through a 3 roll laboratory refiner (a horizontal 3 roll mill) where the particle size was reduced to approximately 22 microns. Thereafter the chocolate was conched by mixing in a 5 quart Hobart mixer for 5 hours with a heat gun blowing on the mix. The conching temperature was 135° F. The chocolate prepared as described above was tempered by heating to 120° F., cooling to 79° F., and reheating to 84.5° F.

One part of glycerine was added to tempered chocolate prepared in the foregoing manner and stirred vigorously while being held at 84.5° F. for a period of ten minutes. Thereafter, the chocolate was poured into one ounce molds which were being vibrated during the molding process. The chocolate in the molds was refrigerated for thirty minutes and then demolded.

When chocolate pieces prepared in the foregoing manner are heated with a heat gun at 120° F., the pieces soften slightly but do not become fluid. In contrast, chocolate pieces prepared from the same formulation without glycerine are more or less fluid and flow at the elevated temperature.

In a separate experiment, a chocolate formulation is prepared using the method and formulation described above, except that 10 parts of dextrose are substituted for 10 parts of sucrose, no glycerine is added, and the molded bars are stored for 21 days at 85° F. and 85% relative humidity, as described in U.S. Pat. No. 2,904,438. When chocolate bars prepared in that fashion are heated to 120° F., the presence of a heat resistant skin on the surface of the chocolate is noted, but the chocolate beneath the skin is flowable.

EXAMPLE 5

Imitation chocolate may also be formed in accordance with the invention. In such products, the amount of cocoa butter is greatly reduced and hard butter is substituted. A typical formulation is as follows:

| Ingredient | Parts by Weight |
|---|---|
| Cocoa | 5.40 |
| Non-fat dry milk | 16.50 |
| Sugar | 45.00 |
| Hard butter | 32.05 |
| Vanillin | 0.05 |

The foregoing ingredients are mixed and refined, as previously described, and heated to 120° F. One part of glycerine is then added. The imitation chocolate is cooled to 85° F. and is used as an enrobing agent for previously prepared centers. The chocolate coating does not stick to the fingers.

EXAMPLE 6

Conventional peanut butter may comprise ground peanuts with a composition of about 45 to 50% by weight of fats and oils and 50 to 55% by weight of nut solids. Sugar and salt are added to taste. The natural peanut butter produced by blending of the peanuts separates rapidly into oil and solids portions on standing, even under refrigeration. Glycerine (0.5% by weight) is added to the natural peanut butter and mixed in a conventional mixer. Separation of the oil from the solids no longer occurs.

EXAMPLE 7

The following ingredients are blended at 85° F.:

| Ingredient | Parts by Weight |
|---|---|
| Butter | 82.50 |
| Flour | 15.00 |

| Ingredient | Parts by Weight |
|---|---|
| Glycerine | 2.50 |

The material is used as a shortening in a normal manner for danish pastry, croissants, puff pastry and the like. As compared to conventional shortening, the butter does not separate from the dough during processing to form the pastry products even when the formed but unbaked products are held on trays for extended periods of time prior to baking.

Heretofore, solid pharmaceutical compositions for oral administration have been made available in two major forms, capsules containing powders and tablets. Tablets are produced by compounding the pharmaceutically active agent with lactose, talc and several other excipients which contribute to the cohesion of the tablet under the conventional process of compression and also permit its release from the compression mold.

It is well known to those skilled in the art that providing the correct ratio of these components can be a difficult problem, particularly for those tablets which require a high proportion of the pharmaceutically active components particularly where the physical nature of the active component does not lend itself readily to the tableting process. It would be extremely desirable therefore to be able to compound these materials in a pharmaceutically acceptable composition which has temperature stability and is readily absorbed into the physiological system. Natural oils and fats would be desirable carriers but unfortunately, most of them have melting points which are far too low for practical purposes, i.e., maintaining the integrity of the tablet at ambient temperatures on the order of 100° F.

The procedures of the present invention provide a ready and simple solution to the problem. The pharmaceutically active composition is compounded with a natural occurring fat or oil and a polyol. As stated above, the high proportion of solid material (in this case pharmaceutically active) which causes problems in the conventional tableting process, is in fact advantageous in the composition of the present invention. The fat/polyol-active compound composition is flowed into molds which are under vibration; the vibration is then ceased and the now temperature-stable tablets can be readily removed from the mold.

If it is desirable to further ensure the integrity and non-mutual adhesion of the tablets by coating them with sugar or similar glazes in a conventional manner, this may be readily done.

EXAMPLE 8

An antacid tablet formula is prepared from the following formulations:

| Ingredient | % by weight |
|---|---|
| Partially Hydrogenated vegetable oil | 40.00 |
| Calcium carbonate | 35.00 |
| Sugar | 21.75 |
| Simethacone | 1.50 |
| Glycerine | 1.50 |
| Flavoring | 88.25 |
| | 100.00 |

The components are mixed in the conventional manner, heated to about 10° F. above their flow point, poured into tableting molds of predetermined shape and permitted to set. In one embodiment, half molds having a raised lip may be used and a second half mold placed thereon while the components are still in liquid form. Conventional measures for removal of displaced air should be taken to ensure desired form.

EXAMPLE 9

An edible fat or oil composition may be prepared in accordance with the invention which is suitable for use in pie crust and pastry dough. A typical formulation is as follows:

| Ingredient | % by Weight |
|---|---|
| Shortening | 31.7 |
| Wheat Starch | 63.5 |
| Glycerin | 2.0 |
| Nonfat dry milk | 2.8 |
| | 100.0 |

The shortening is a commercial vegetable oil shortening containing hardstock and partially hydrogenated soybean oil.

The composition is prepared by first blending together the nonfat dry milk solids and starch in a mixing bowl. The shortening is added to the dry materials and blended for about 30 seconds. Glycerine is then added and mixed for about 80 seconds. Small dry particles or crumbs are formed.

The crumbs are used as the "shortening phase" component of a pie crust dough by sprinkling the crumbs uniformly over the surface of a sheeted dough prepared with wheat flour, wheat starch, salt, water and other ingredients of the dough formulation and then "rolled in" the sheeted dough by conventional means. The "shortening phase" crumbs contain about 25% by weight of the ingredients of the pie crust dough.

There is no separation of the shortening or edible oil from the pastry dough during the processing thereof to form pie crust products or from unbaked product held on trays for extended time. It is also observed that discrete regions of the shortening are evident in the unbaked pastry dough product held on trays for an extended period of time.

EXAMPLE 10

A pie crust dough may be prepared in accordance with the invention where "shortening phase" dough granules are added to and mixed with the "dough" phase ingredients prior to sheeting and a "shortening phase" in granular form is separately added to the sheeted "dough" phase during final processing of a pie crust dough. The following typical formulations are used during preparation of the pie crust dough:

| Ingredients | % by Weight | % by Weight Pie Crust |
|---|---|---|
| Shortening Phase | | |
| Shortening | 31.68 | 7.92 |
| Wheat Starch | 63.50 | 15.88 |
| Glycerine | 2.00 | 0.50 |
| Nonfat Milk Solids | 2.82 | 0.70 |
| | 100.00 | 25.00 |
| Dough Granules | | |
| Shortening | 8 17 | 1.36 |
| Vegetable Oil | 29.73 | 5.00 |
| Wheat Starch | 59.46 | 10.00 |
| Glycerine | 2.64 | 0.44 |
| | 100.00 | 16.80 |

| Ingredients | % by Weight | % by Weight Pie Crust |
|---|---|---|
| Dough Phase | | |
| Wheat Flour | 48.80 | 28.38 |
| Salt | 0.86 | 0.50 |
| Shortening | 4.90 | 2.85 |
| Vegetable Oil | 9.84 | 5.73 |
| Water | 8.82 | 10.95 |
| Dough Granules | 16.80 | 9.80 |
| | 100.00 | 58.19 |

The shortening is a commercial vegetable oil shortening containing hardstock and partially hydrogenated soybean oil.

The "shortening phase" is prepared by blending together the wheat starch and nonfat milk solids in a mixing bowl. The shortening is added to the dry materials and blended for about 30 seconds. Glycerine is then added to the mixture and mixed for about 80 seconds. Small particles or crumbs are formed which are removed from the mixer and heat treated for about 20 minutes a 115° F.

The "shortening phase" dough granules are prepared by mixing together the vegetable oil and shortening at medium speed in a Hobart Mixer fitted with a whisk paddle for about 2 minutes. Wheat starch is added to the oil mixture in the Hobart Mixer fitted with a harp paddle and mixed for one minute at low speed. Glycerine is then added in about 10 seconds and the admixture is mixed for about an additional 20 seconds. Small granules or crumbs are formed.

The "dough" phase is prepared by weighing the wheat flour and salt into a mixing bowl and dry blending for about 45 seconds. Water is then added, and mixing is continued for another 45 seconds. The shortening, vegetable oil and "shortening phase" dough granules are then added and mixing is continued for about 60 seconds. The dough is then sheeted in a pastry sheeter. The "shortening phase" crumbles are sprinkled over the surface of the sheeted dough and then rolled in. The dough is then booked three times and sheeted to 2/32 inches thick. Dough pieces are cut, folded and frozen.

There is no separation of shortening or oil from the dough observed during processing the dough, while the dough is held on trays for extended periods of time or after the frozen dough is thawed.

It will be readily apparent to those skilled in the art that a wide variety of food, cosmetic, pharmaceutical or other compositions can be formulated utilizing the method of the invention to produce a variety of novel products which may benefit from the ability to immobilize a low melting point fat or oil.

What is claimed is:

1. A dry, viscosity-stable fat and oil shortening composition comprising a dry, substantially uniform admixture of a shortening component including a solid, low melting point edible fat or oil suitable for use in a pastry dough product, at least about 15 percent by weight of a particulate edible solid carrier component suitable for use in a pastry dough product and from 0.2 percent to 10 percent by weight of an edible viscosity stabilizer polyol component in liquid form, said dry, fat and oil shortening composition being adapted for incorporation with flour and other ingredients to provide at least a portion of the shortening component needed in the preparation of a pastry dough product.

2. The dry, viscosity-stable shortening composition as claimed in claim 1, wherein said dry shortening admixture contains an amount of said shortening component suitable to provide substantially the amount of shortening component to be admixed with flour and other ingredients in the preparation of a pastry dough product.

3. The viscosity-stable shortening composition as claimed in claim 1, wherein said edible solid carrier is flour, starch or a mixture thereof.

4. The viscosity-stable shortening composition as claimed in claim 1, wherein said dry shortening admixture contains an amount of said polyol component suitable to provide substantially the amount of polyol viscosity stabilizer to be admixed with flour and other ingredients in the preparation of a pastry dough product.

5. The viscosity-stable shortening composition as claimed in claim 1, wherein said composition is in a form of a plurality of dry crumbs, each of said dry crumbs containing an admixture of said shortening component, said particulate solid carrier component and said polyol component.

6. The viscosity-stable shortening composition as claimed in claim 1, wherein said shortening component is present in said dry fat and oil shortening composition in an amount from 5% to 85% by weight.

7. A dry, particulate, viscosity-stable shortening composition suitable for use in preparing a pastry dough product consisting essentially of a substantially uniform admixture of from 5 percent to 85 percent of a shortening component including a solid low melting point edible fat or oil suitable for use in a pastry dough product, from 15 percent to 85 percent of a particulate solid edible carrier component suitable for use in a pastry dough selected from the group consisting of flour, starch, nonfat milk solids and mixtures of the same and from 0.2 percent to 10 percent of an edible liquid viscosity stabilizer polyol component, said composition being in the form of a plurality of small, dry crumbs with each of said crumbs consisting essentially of an admixture of said shortening component, said particulate solid carrier component and said polyol component, and wherein there is substantially no separation of said shortening component from said crumbs.

8. The viscosity-stable shortening composition as claimed in claim 7, wherein said shortening component is butter, a fat, a vegetable oil or mixtures thereof.

9. The viscosity-stable shortening composition as claimed in claim 7, wherein said polyol component is glycerine, propylene glycol, mannitol, sorbitol or mixtures thereof.

10. A method of preparing a solid, viscosity-stable shortening composition suitable for use as a shortening in the preparation of pastry dough products comprising mixing in a mixing bowl from 5 percent to 85 percent by weight of an edible solid shortening containing a low melting point fat or oil suitable for use in a pastry dough with from 15 percent to 95 percent by weight of an edible solid carrier component in particulate form and from about 0.8 percent to about 5 percent by weight of a viscosity stabilizer polyol component in liquid form until a plurality of solid dry particles or crumbs of said shortening composition are formed, each of said solid dry particles or crumbs containing an admixture of shortening, solid carrier component and viscosity stabilizer polyol component from which there is substantially no separation of shortening.

11. The method of preparing a shortening composition as claimed in claim 10, wherein said solid shortening is butter, a vegetable oil, a fat or mixtures thereof.

12. The method of preparing a shortening composition as claimed in claim 10, wherein said solid carrier component is fluid, starch, nonfat milk solids, or a mixture thereof.

13. The method of preparing a pastry dough product comprising providing a sheet of pastry dough comprising flour, starch, salt and water, substantially uniformly distributing over the surface of said sheeted pastry dough a plurality of particles or crumbs of a dry, particulate shortening composition as claimed in claim 7, and incorporating said particles of said shortening composition in said pastry dough.

14. A pastry dough product comprising a plurality of sheeted layers of a pastry dough, said layers comprising an admixture of flour, flavorants, starch, and water, wherein said product has a plurality of discrete regions of a viscosity-stable shortening composition comprising a substantially uniform admixture of from 5 percent to 85 percent by weight of a solid shortening component containing a solid low melting point edible fat or oil, from 15 percent to 95 percent by weight of a particulate edible solid carrier component, and from about 0.8 percent to about 5 percent by weight of a viscosity stabilizer polyol component in liquid form.

15. The viscosity-stable shortening composition as claimed in claim 1, wherein said edible solid carrier is wheat starch.

16. The method of preparing a shortening composition as claimed in claim 10, wherein said solid carrier component is wheat starch.

17. The pastry dough product as claimed in claim 14, wherein said edible solid carrier component is flour, starch, or a mixture thereof.

18. The viscosity-stable shortening composition as claimed in claim 7, wherein said particulate solid carrier composition is wheat starch.

19. The viscosity-stable shortening composition as claimed in claim 7, wherein said uniform admixture consists essentially of at least about 30% of said shortening component.

* * * * *